United States Patent
Krofta (10) Patent No.: US 6,174,434 B1
(45) Date of Patent: *Jan. 16, 2001

(54) THREE ZONE DISSOLVED AIR FLOATATION CLARIFIER WITH FIXED LAMELLAE AND IMPROVED PADDLE-AND-RAMP SLUDGE REMOVAL SYSTEM

(75) Inventor: Milos Krofta, Lenox, MA (US)

(73) Assignee: The Lenox Institute of Water Technology, Inc., Lenox, MA (US)

( * ) Notice: Under 35 U.S.C. 154(b), the term of this patent shall be extended for 0 days.

This patent is subject to a terminal disclaimer.

(21) Appl. No.: 09/236,910

(22) Filed: Jan. 25, 1999

Related U.S. Application Data (60) Continuation-in-part of application No. 09/044,753, filed on Mar. 19, 1998, now Pat. No. 5,863,441, which is a division of application No. 08/638,116, filed on Apr. 26, 1996, now Pat. No. 5,846,413.

(51) Int. Cl.[7] .................. C02F 1/24; C02F 9/00; B01D 21/08; B01D 21/02

(52) U.S. Cl. .......... 210/221.2; 210/194; 210/205; 210/202; 210/256; 210/259; 210/522; 210/525

(58) Field of Search ................. 210/194, 195.1, 210/205, 256, 521, 522, 221.1, 221.2, 525, 202, 259

(56) References Cited

U.S. PATENT DOCUMENTS

| | | |
|---|---|---|
| 2,324,400 | 7/1943 | Kelly . |
| 2,679,477 | 5/1954 | Kivari . |
| 2,695,710 | 11/1954 | Gibbs . |
| 2,713,026 | 7/1955 | Kelly . |
| 2,874,842 | 2/1959 | Krofta . |
| 2,876,863 | 3/1959 | Kivari . |
| 3,182,799 | 5/1965 | Krofta . |
| 3,246,763 | 4/1966 | Baum . |
| 3,542,675 | 11/1970 | Mail . |
| 3,794,171 | 2/1974 | Kimura . |
| 3,820,659 | 6/1974 | Parlette ................................ 210/195 |
| 4,022,696 | 5/1977 | Krofta . |
| 4,043,912 | 8/1977 | Bascope . |

(List continued on next page.)

FOREIGN PATENT DOCUMENTS

| | | |
|---|---|---|
| 63-20086 | * 1/1988 | (JP) . |
| 1340793 | 9/1987 | (SU) . |
| 1565812 | 5/1990 | (SU) . |

*Primary Examiner*—Thomas M. Lithgow
(74) *Attorney, Agent, or Firm*—Peter J. Manus; Dike, Bronstein, Roberts & Cushman (57) ABSTRACT

A compact dissolved-air-flotation (DAF) clarifier treats raw water with suspended solid contaminants first in a flocculator at the center of an annular tank where microscopic air bubbles float flocked contaminants to form a floating sludge layer. The flocculator has a fixed, cylindrical sidewall. A first clarification, calming and degassing occur here. The water then flows radially outwardly into the tank with a straight cylindrical outer wall where further quiet clarification occurs. A third level of clarification occurs in a lower portion of the tank, specifically, within a set of fixed, inclined lamellae, where a final clarification occurs. The bottom wall of the tank has a set of apertures which allow a gravity flow of clarified water through a layer of pressurized gas to an underlying collection compartment. A set of rotating paddles push the sludge layer up a ramp to an opening in an inclined discharge conduit. The paddles extend generally from the region over the full surface area of the tank, to its outer wall, which is preferably cylindrical. The ramp twists about its radial axis, being shallower and longer at its outer edge and steeper and shorter at its inner edge. An offset drive operating through a belt rotates the paddles, a movable cylindrical wall surrounding the lower portion of the fixed flocculator wall, and at least one scraper secured at one end to the movable wall and extending radially under the lamellae.

8 Claims, 8 Drawing Sheets

U.S. PATENT DOCUMENTS

| | | |
|---|---|---|
| 4,070,277 | 1/1978 | Uban et al. ............ 209/168 |
| 4,082,671 | 4/1978 | Kelly . |
| 4,184,967 | 1/1980 | Krofta . |
| 4,377,485 | 3/1983 | Krofta . |
| 4,450,072 | 5/1984 | Suplicki . |
| 4,626,345 | 12/1986 | Krofta . |
| 4,931,175 | 6/1990 | Krofta . |
| 5,268,099 | 12/1993 | Krofta et al. . |
| 5,296,149 | 3/1994 | Krofta . |
| 5,306,422 | 4/1994 | Krofta . |
| 5,320,750 | 6/1994 | Krofta . |
| 5,415,771 | 5/1995 | Krofta . |

* cited by examiner

THREE ZONE DISSOLVED AIR FLOATATION CLARIFIER WITH FIXED LAMELLAE AND IMPROVED PADDLE-AND-RAMP SLUDGE REMOVAL SYSTEM

REFERENCE TO RELATED APPLICATIONS

This application is a continuation-in-part of U.S. Ser. No. 09/044,753, now U.S. Pat. No. 5,863,441 filed Mar. 19, 1998 the disclosure of which is incorporated herein by reference, which in turn is a divisional application of U.S. Ser. No. 08/638,116 filed Apr. 26, 1996, now U.S. Pat. No. 5,846,413.

BACKGROUND OF THE INVENTION

This invention relates in general to an apparatus and method for the clarification of water where the removal of suspended particles is accomplished by a flocculating agent and flotation using a stream of rising, microscopic air bubbles. More specifically, it relates to apparatus and a process for dissolved air flotation clarification using multiple sequential zones of clarification, the final zone being defined by a fixed set of inclined lamellae, clarified water removal through an air pocket, and improved removal of floated sludge.

Water clarification, the removal of particulate contaminants suspended in water, is used to treat waste water from manufacturing processes, particularly in the paper and pulp industries, in the treatment of municipal water drinking supplies, and in sewage treatment. The water can be clarified by sedimentation or flotation of the particles. Known sedimentation techniques and apparatus are efficient, but are limited even at peak efficiency to a comparatively slow sedimentation rate, about 0.5 gallons per minute per square foot (20 liters/min/m$^2$). To handle large volumes of raw input water, sedimentation facilities must therefore be large, with attendant cost and space utilization disadvantages. Also, sedimentation tanks are typically much deeper than tanks for flotation clarification and the sludge removed has a lower solids content than with flotation clarification.

Flotation techniques dissolve a few percent of air by volume in pressurized water and then release the air in the form of microscopic bubbles which attach to the particles and carry them upwardly to the surface where they form a floating sludge. This general type of clarification is sometimes termed dissolved air flotation or "DAF". The particles are usually coagulated and flocculated using conventional agents such as alum and/or polymers before the air bubbles are introduced. Flotation techniques are theoretically capable of achieving clarification rates of 7.5 gallons per minute per square foot (GPM/SQFT) of flotation area (300 l/m$^2$/min). Heretofore in practice the rates have been less than this theoretical value, but significantly better than for sedimentation techniques.

Several early attempts by applicant to use flotation techniques to clarify water are described in U.S. Pat. No. 2,874,842 issued in 1959 and U.S. Pat. No. 3,182,799 issued in 1965. They used a stationary tank with no skimmers or other moving components in the tank. The gas bubbles were introduced via the main raw water inlet and guided within the tank by an internal deflector ('842) or a stack of internal baffles ('799). Because the gas bubbles were guided by stationary components, there was no design problem created by the turbulence of moving part in the flotation tank. Also, these devices did not lend themselves to treatment at high flow rates. The '799 apparatus had the additional problems in that (i) the inlet water had to be separately fed from the side to the region between each adjacent pair of baffles and (ii) the flow paths for floated particles varies depending on the vertical position of the associated baffles defining the flow path. This latter situation means that the apparatus either does not fully treat the inlet water, or is slow.

Applicant holds several other U.S. patents for water clarification apparatus and processes, including U.S. Pat. Nos. 4,022,696; 4,377,485; 4,626,345; 4,184,967; and 4,931,175, all of which greatly improve over the performance of the early '842 and '799 devices. In the '696 clarifier, which continues to be sold under the trade designations "SPC" and "Supracell", the flotation occurs in a circular tank. The raw water is fed into the tank via a central pipe, a hydraulic joint, and an inlet pipe with multiple outlets immersed in the tank which rotates about the tank. The inlet flow is oriented opposite to the direction of rotation of the inlet pipe and is at a velocity with respect to the rotation rate such that the raw water has a net zero velocity as it enters the tank. The raw water inlet flow assembly and a scoop for removing the floated sludge are mounted on a heavy carriage driven to rotate about the tank. The scoop is preferably a spiral-bladed scoop of the general type described in applicant's U.S. Pat. No. 4,184,967, although it now typically has one or two spiral blades, even in large size units. It has a motor mounted on the carriage to rotate the scoop. The rate of rotation of the carriage about the tank is set so that the floated particles will reach the surface of the water held in the tank in the time of one rotation. A good degree of clarification can be achieved with each rotation of the carriage using a comparatively shallow tank, e.g., 16–18 inches. This SPC unit clarifies at a rate of about 130 liters/m$^2$/min (3.25 gal/min./sq.ft.). This is much better than the rate using sedimentation techniques, but less than half of the theoretical maximum rate.

In the "Supracell" and the other clarifiers described in the aforementioned patents, there are common design features and limitations. For one, the flotation of the flocked particles is generally vertical (or follows inclined conical plates), and is in a body of water that is comparatively shallow and generally free from turbulence. Second, in all of these designs the removal of the floated sludge is by a bladed, rotating scoop feeding an inclined discharge pipe. Third, in each design clarified water is collected by pipes or hollow headers with inlet apertures. The pipes are stationary or rotating in the water at the bottom of the tank. In units using a second filtration stage, e.g. a bed of sand at the bottom of the clarification tank, the pipes can be embedded in the sand bed. Also, heretofore, in order to increase the capacity of a given type of clarifier, one built a larger diameter tank. While in theory one can build a large enough tank to accommodate any clarification load, cost and space constraints have provided practical limitations on the capacities of these units.

More recent approaches to increasing clarification capacity, while retaining physical compactness and a competitive cost of manufacture and operation, are described in U.S. Pat. Nos. 5,268,099; 5,296,149; 5,320,750; 5,415,771; and 5,306,422, all to the present applicant as sole or joint inventor. The '149 patent describes a clarification sold under the trade designation "SPC-L" as an improvement over the '696 "Supracell" brand clarifier, as well as the '175 conical plate or "SPC-P" clarifier. The SPC-L clarifier substantially fills a shallow tank with intersecting radial and conical concentric plate-like lamellae. They form an annular array of inclined, open-ended channels which each lock and transport a column of water to be treated. The lamellae rotate slowly in a tank between a fixed raw water distribution header and a fixed clarified water withdrawal header. Rotation of the lamellae hydraulically couple a floated sludge layer to rotate the sludge onto a ramp-like lip of a fixed, hollow sludge skimmer. A screw conveyor mounted within the skimmer rotates to advance the collected sludge radially across the clarifier tank to a discharge pipe. This clarifier operates with one stage in a shallow tank that is substantially filled with the lamellae.

U.S. Pat. No. 5,306,422 describes a clarifier using a double stack of DAF clarifiers where the output of the upper clarifier is fed to the lower clarifier for further clarification. Clarification occurs sequentially in two separate clarifiers with the output of one clarifier fed by gravity to the underlying clarifier in the stack.

U.S. Pat. No. 5,415,771 describes a high capacity clarifier with a single large diameter tank that is divided into multiple sectors by rotating raw water distribution headers and associated clarified water collection headers. Rotating bladed scoops associated with each of these plural header sets remove the floated sludge. Again, clarification occurs in a single stage in a single shallow tank.

U.S. Pat. No. 5,320,750 described an improvement on the '345 clarifier (sold under the trade designation "SASF"). The SASF clarifier has a central flocculator with a spill-over feed to a surrounding DAF clarification tank with a filter media, such as sand, located at the bottom of the tank. The '750 clarifier, sold under the trade designation "SAF-BP", isolates the first filtrate and uses it to backwash the sand bed sector-by-sector. Clarified water is collected via a network of apertured pipes embedded in the sand layer. Floated sludge is removed by a rotating bladed scoop. The '750 patent also discloses a valve, sold under the trade designation "KD", that introduces the microscopic air bubbles to the treated water in the central flocculator.

The '696 "Supracell" brand clarifier first introduced in the 1970's continues to be a standard, well-received product for many applications. There remains, however, a need for a compact, non-filtering clarifier which offers performance, maintenance and cost advantages over the "Supracell" clarifier.

It is a principal object of this invention to provide a DAF-type clarifier and process with an enhanced clarification efficiency and capacity as compared to a comparably-sized "Supracell" clarifier.

A further principal object is to provide a sludge removal apparatus and method which avoids the use of rotating bladed scoops and carriages that rotate around the tank to transport the scoop.

Another principal object is to provide the foregoing advantages while reducing power consumption as compared to a comparably-sized "Supracell" clarifier.

Another object is to provide a sludge removal apparatus and method with the foregoing advantages which operates effectively and reliably with comparatively high sludge production rates and thick sludges.

Still another object is to provide such a clarifier which is also compact.

A further object is to provide a clarifier with the foregoing advantages which has a favorable cost of manufacture and favorable operating costs as compared to comparable capacity "Supracell" type clarifiers.

SUMMARY OF THE INVENTION

A dissolved air flotation (DAF) type clarifier has a central flocculator which receives raw water treated with a flocculating agent from an inlet pipe. A stream of recycled water with dissolved air is separately introduced into the flocculator to produce a stream of microscopic air bubbles. Interaction of the flocculating agent and the air bubbles in the flocculator produces a first clarification, a degassing, and a calming of the treated raw water as the particulate flock and are carried upwardly to the surface of the water. The flocculator defines a clarification zone I.

An annular tank or "ring" surrounds the flocculator. Openings in a rotating sidewall of the flocculator direct the treated water radially outwardly to an upper portion of the tank. The moving flocculator sidewall, with a rotary seal at its bottom edge, isolates clarification in the outer tank from the turbulence in the flocculator produced by the raw water inlet flow and the introduction of the air bubbles. This turbulence dissipates in the flocculator, which can be viewed as calming the mix of inflows. A "quiet" DAF-clarification occurs in this upper portion of the tank defining a clarification zone II. Flocked particulates are carried by air bubbles to the upper surface of the tank, which is preferably at the same level as in the flocculator.

Further slow clarification occurs in a zone III defined in a first embodiment by a set of intersecting concentric conical and flat radial lamellae that substantially fill the lower portion of the tank. The lamellae are preferably formed of plastic sheets interlocked and supported to rotate within the tank about its center. The lamellae together produce an array of inclined, open-ended channels which transport a column of treated water with substantially no turbulence within the column despite the rotation. Flocked particulates floated within the channels rise through zone II to a floated sludge layer formed by clarification in all three zones. Coarse particles settle to the bottom of the tank where they are continuously scraped into a sump by a bottom scraper mounted on the bottom of rotating lamellae ring.

In a second, and presently preferred form, the lamellae are a set of generally radially oriented, inclined plates (lamellae) that overlap, when viewed vertically, at least adjacent plates. These radial lamellae, like the intersecting conical and radial lamellae, also substantially fill the lower portion of the tank (zone III), but they are stationary. Preferably they are mounted between circular rings, the outer ones of which are fixed to the outer tank wall. There is preferably a clearance between the inner end of this plate assembly and the inner tank wall (which is also the flocculator sidewall) which is likewise stationary. In this preferred form, this clearance accommodates a moving cylindrical wall that supports and transmits rotational motion to at least one scraper extending radially under the lamellae assembly and rotating around the tank to clear settled particles from the tank bottom wall.

In either form, the tank bottom wall is perforated by small, generally uniformly spaced holes which allow the removal of clarified water from the bottom of the tank, adjacent the lower end of the lamellae. A bottom plate and a cylindrical sidewall define a clarified water collection compartment immediately below the apertured bottom wall of the tank. A source of pressurized gas creates a shallow gas layer or pocket that extends under the apertured bottom wall. Clarified water falls through the holes against the pressure of, and through, the pressurized gas pocket to collect in the compartment and is withdrawn via a clarified water outlet pipe. A level sensor detects the level of the collected clarified water and adjusts the level by controlling an air bleed valve to increase or reduce the air pressure in the compartment.

To remove the sludge layer, one or more paddles mounted and rotated over the tank on support arms sweep the sludge up a fixed ramp and into an inclined discharge conduit that extends radially over the tank. The paddle is preferably a set of multiple, equiangularly spaced paddles that are each flexible to accommodate passage over the ramp despite being secured on a rigid arm. Preferably the paddles are driven in unison with the lamellae by a motor mounted at the periphery of the tank and coupled to the rotating members via a variable gear transmission, and a tensioned timing belt. Rotation of the sludge layer and the generally radially outward flow of the water near the top of the tank move sludge from a position over the flocculator to a position over the tank where the paddles remove it.

In the presently preferred form of this invention, the outer tank wall throughout zone II is cylindrical, thus increasing the surface area of the clarifier available for flotation as compared to a clarifier with a conical upper tank wall and/or cover. To handle the increased sludge load made possible by the cylindrical tank wall, and do so at a commercially efficient rate of operation, and even with thickened sludges, the paddles are preferably four in number and they each interact with a ramp that twists about its radial/longitudinal axis to present a longer, flatter ramp surface at the outer edge of the tank and a shorter, steeper ramp surface at the inner edge of the tank. The ramp is fan-shaped, increasing in width with increasing radius, so that a paddle traversing the ramp is in generally continuous contact over its entire length with the ramp. The sludge lifted up the ramp dumps into an opening in the top of the discharge conduit, this dumping occurs across the full radius of the tank, and generally at the same time across the tank.

Viewed as a process, the invention includes the sequential clarification of raw water treated with a flocculating agent in (i) a flocculation zone where dissolved air is released to form microscopic air bubbles, (ii) an upper portion of an annular tank adjacent the flocculator, and (iii) a set of inclined, open-ended channels in a lower-part of the annular tank (the "channels" being columns of water in one form and inclined, radial "slices" of water in a second form). Turbulence in the flocculator is isolated from the following clarifications in zones II and III. The invention also includes gravity withdrawal of clarified water from the bottom of the tank through a layer of pressurized air. The invention also includes collecting the clarified water, monitoring its level, and adjusting the outflow of the clarified water and the compressed air to maintain a pre-set water levels in the clarifier. To remove the sludge layer, the invention includes the steps of periodically sweeping the sludge from the surface of the water in the tank and then lifting the sludge thus collected up a ramp into a collection receptacle. The lifting occurs over distances that increase as a function of radius, even through it occurs simultaneously, and to the same height, at every radius across the ramp.

These and other features are objects of the invention will be more fully understood from the following detailed description which should be read in light of the accompanying drawings.

DETAILED DESCRIPTION OF THE PREFERRED EMBODIMENTS

Figure 1:
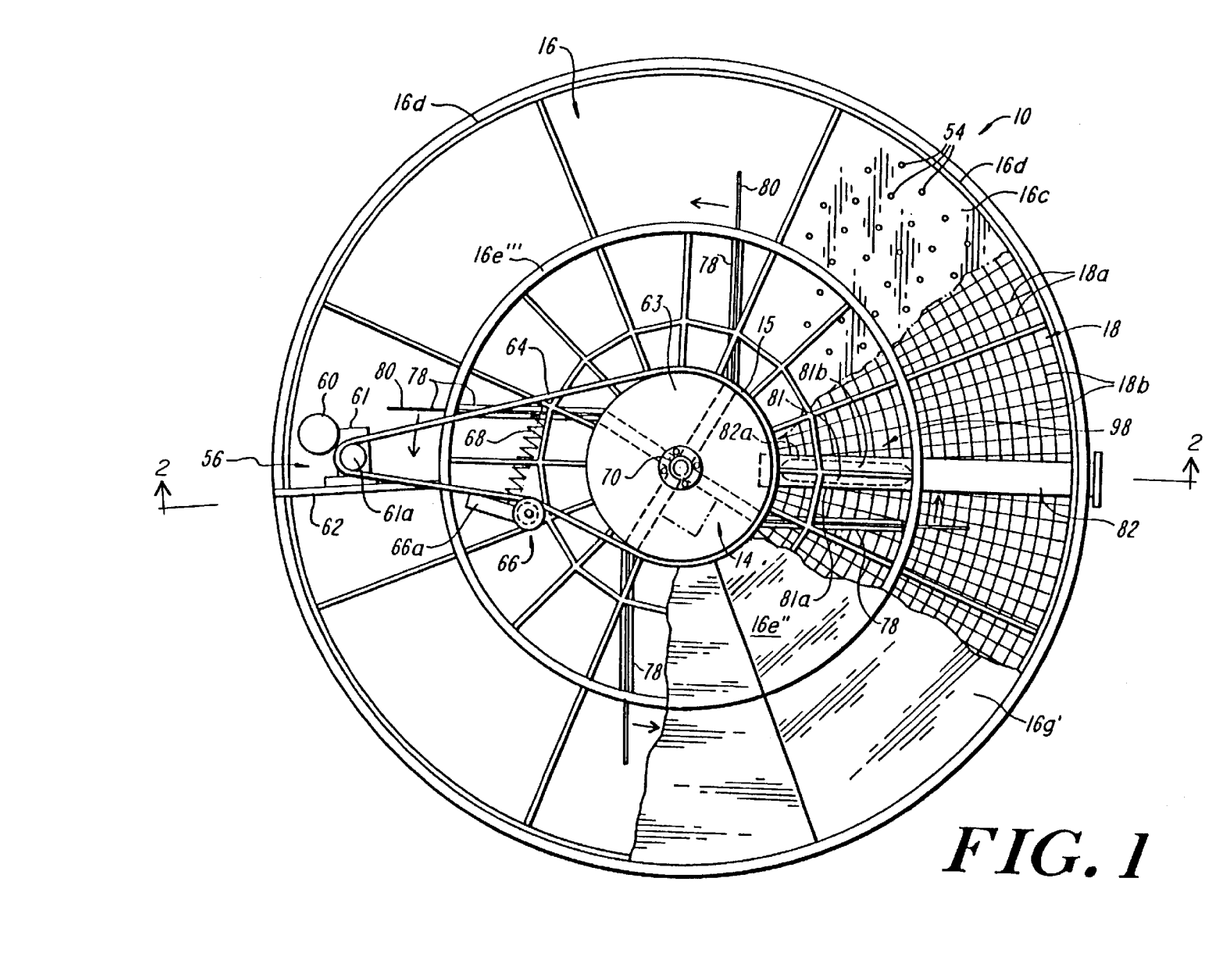
FIG. 1 is a top view of a DAF clarifier according to the present invention, with portions broken away.
Figure 2:
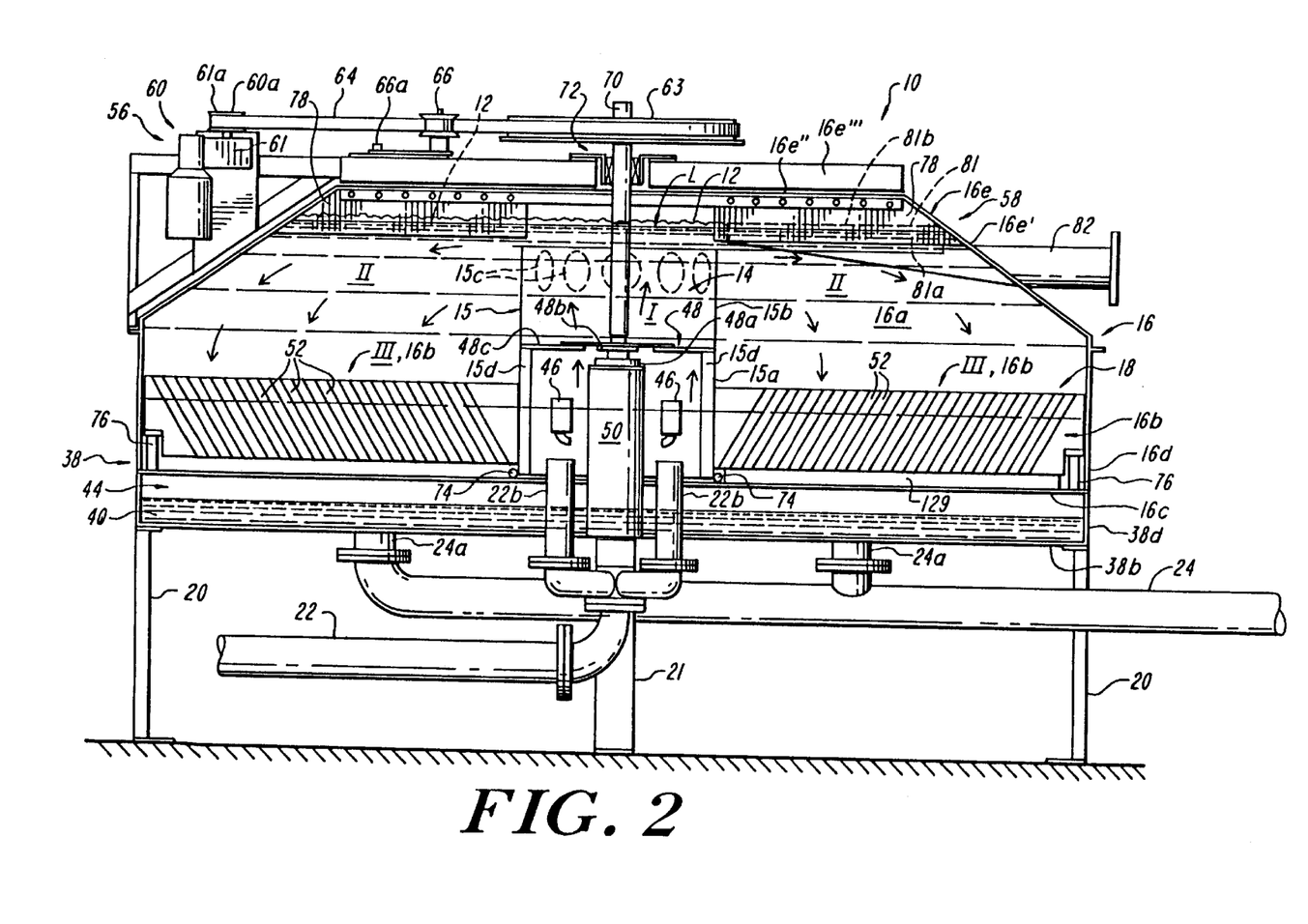
FIG. 2 is a view in vertical section along the line 2—2 of the clarifier shown in FIG. 1.
Figure 3:
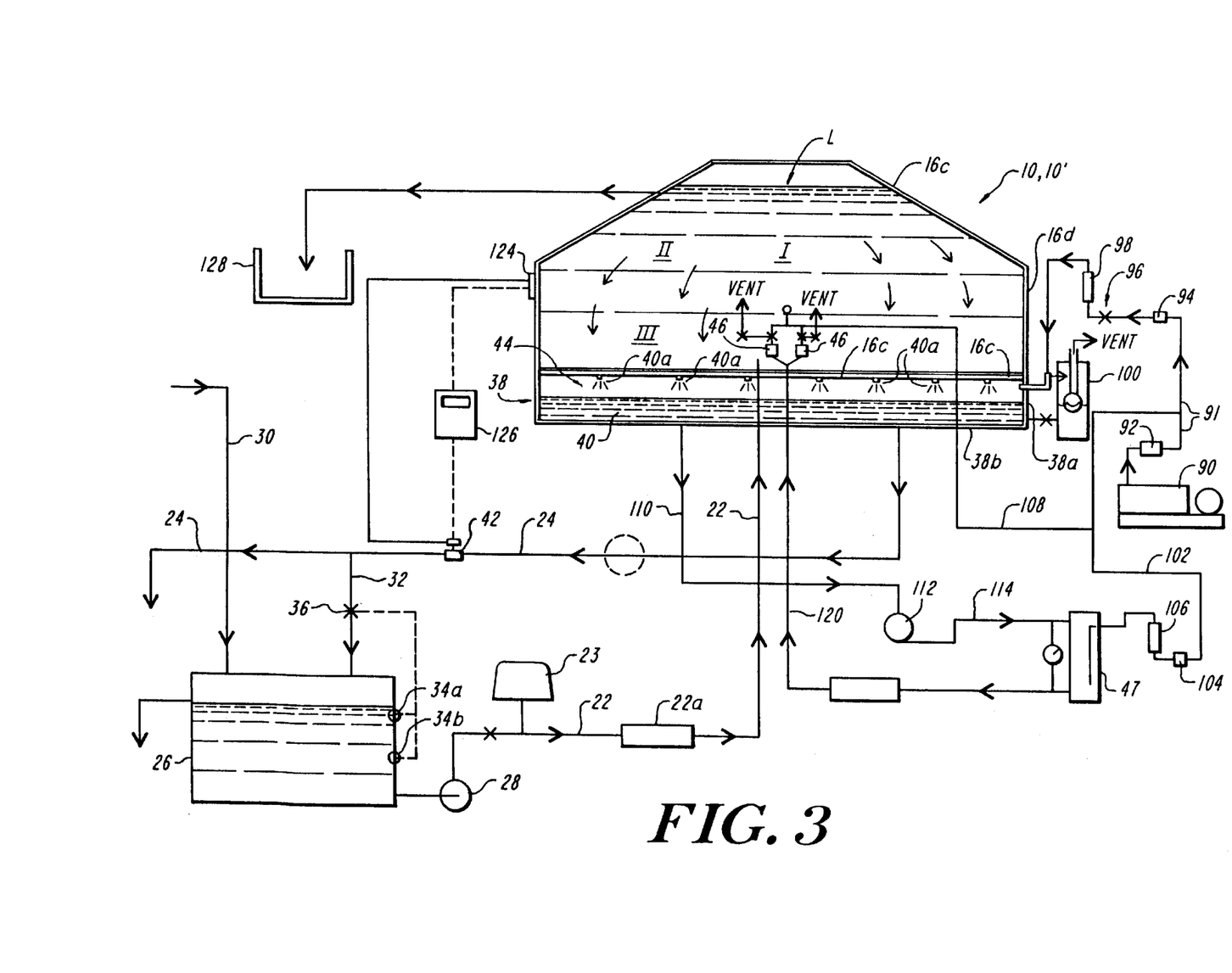
FIG. 3 is a schematic illustration of a fluid control system for the clarifier.
Figure 4:
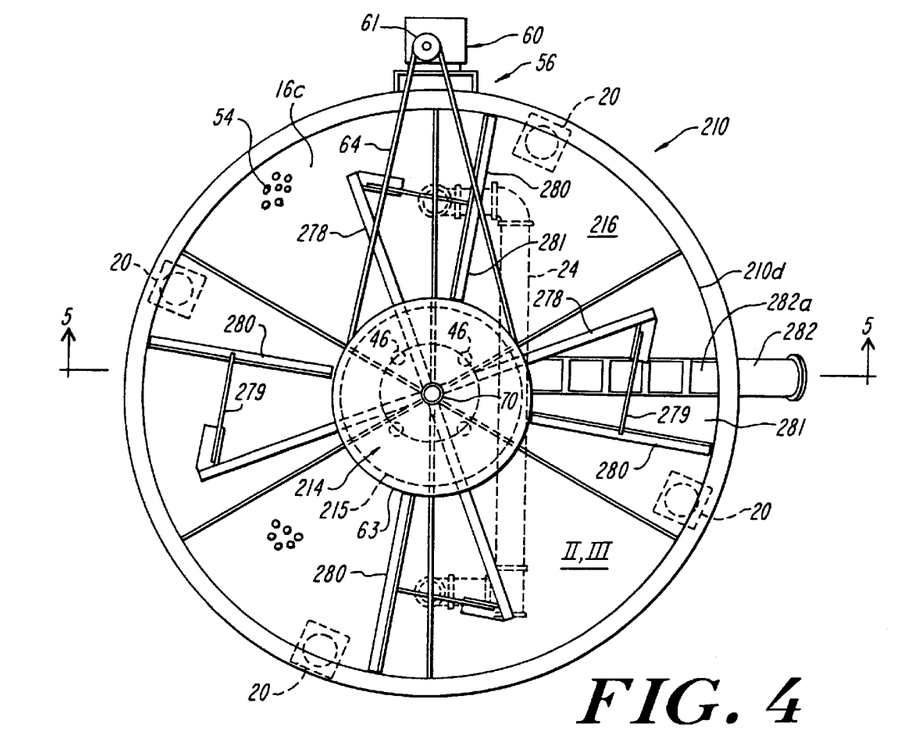
FIG. 4 is a top plan view corresponding to FIG. 1 of an alternative, preferred, embodiment of the present invention, but without the radial plates in the outer tank.
Figure 4A:
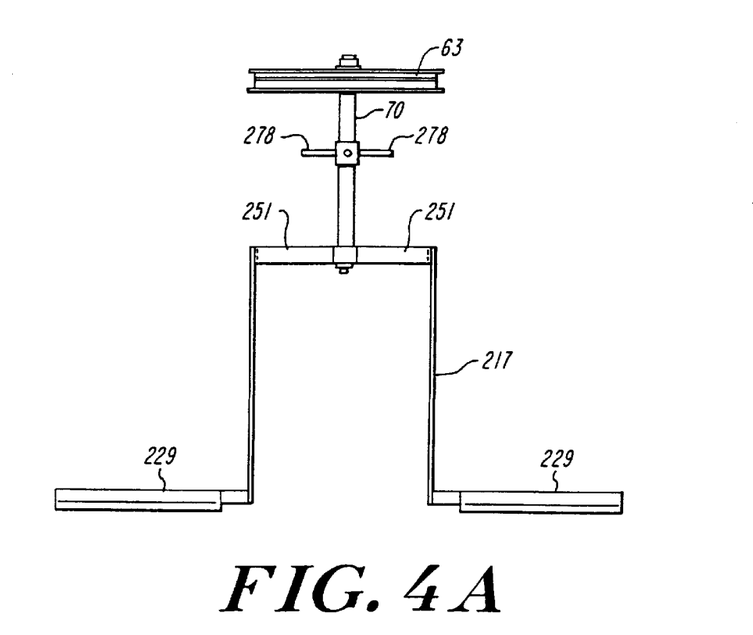
FIG. 4A is a detailed view in vertical section of the rotating parts of the clarifier shown in FIG. 4.
Figure 5:
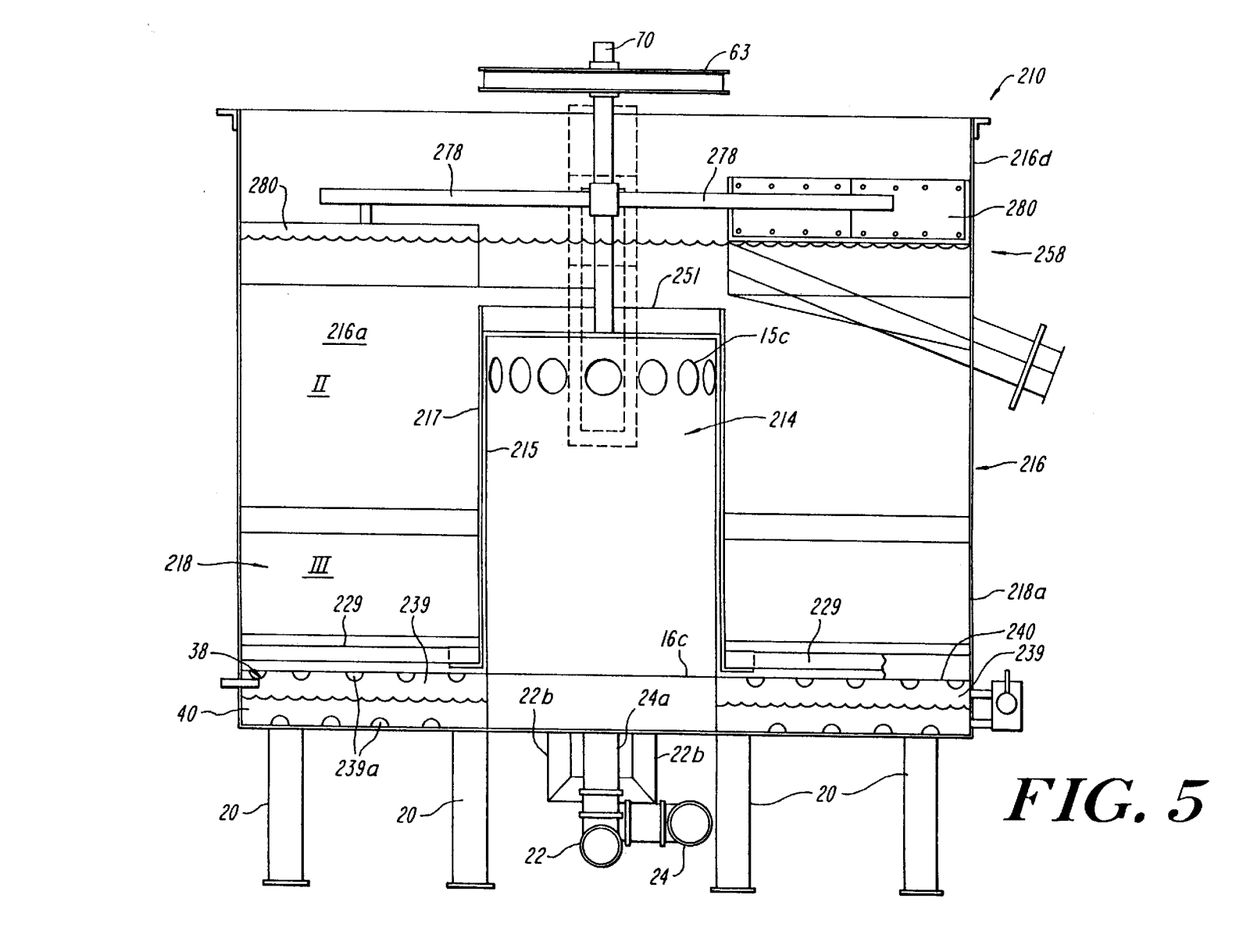
FIG. 5 is a view in vertical section along the line 5—5 in FIG. 4, but showing the radial plates in the outer tank.
Figure 6:
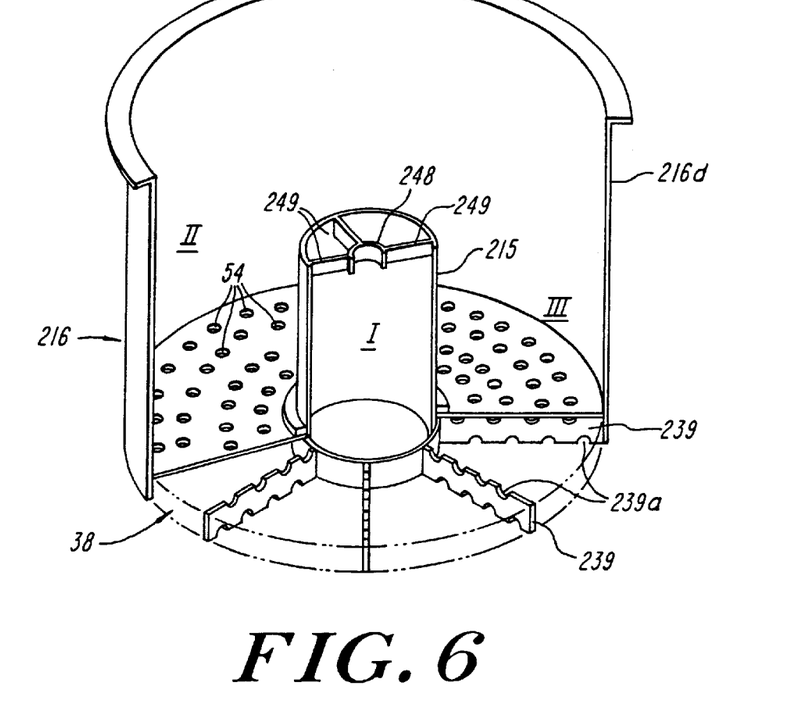
FIG. 6 is a simplified view in perspective, with portions broken away, of the tank inner, outer, and bottom walls and the underlying air compartment shown in FIGS. 4 and 5.

FIGS. 1–3 show a dissolved air flotation (DAF)-type clarifier 10 that removes suspended particulate contaminants from a liquid, particularly water, as a layer 12 of floated sludge. FIGS. 4–9B show clarifier 210 which uses the same three zone clarification as in clarifier 10, but also uses multiple improvements that are described in detail below. Like parts in the different embodiments are marked with the same reference number, but like parts in the FIGS. 4–9 embodiment add the number "2" as a prefix where the parts are not identical, or substantially identical. For example, tank 16 corresponds to tank 216, but they differ, among other things, in the construction of their upper, outer wall portions. For convenience, the invention will be described with reference to clarifying raw water, but it will be understood that "water" includes a variety liquids, and in particular, petroleum and other chemicals, some of which are ordinarily considered flammable or explosive. The clarifiers 10, 210 are particularly useful where the incoming suspended solids are below 3 grams/liter (3,000 ppm). Raw treated water means unclarified water which has had a flocculating agent added to it, or a flocculating agent and microscopic air bubbles to produce the flotation.

The clarifier 10 is generally cylindrical with a central flocculator 14, defined by a rotatable cylindrical sidewall 15, and surrounding, generally annular or ring-shaped tank 16 with an upper portion 16a and a lower portion 16b. A set of intersecting radial (18a) and concentric conical (18b) plate-like lamellae 18 substantially fill the lower tank portion 16b. The lamellae 18 are preferably formed of a plastic material for low weight, corrosion resistance, ease of cleaning, and cost. The construction and operation of the lamellae are described in detail in U.S. Pat. No. 5,296,149, the disclosure of which is incorporated herein by reference. The tank 16 has a bottom wall 16c, a cylindrical sidewall 16d, and a cover assembly 16e with a truncated conical portion 16e', a flat central portion 16e", and a mounting flange 16e'''.

With particular reference to FIGS. 2, and 3, the clarifier 10 is supported on a set of legs 20 arranged equiangularly about its periphery and a central support 21. The legs 20 and support 21 provide clearance for a main inlet pipe 24 carrying raw water to be clarified and an outlet pipe 24 for clarified water. The raw water entering the clarifier has had a conventional flocculating agent, such as alum or a polymer, added to it, as shown schematically at 23 in FIG. 3. A flowmeter 22a measure the inlet flow rate of raw, treated water from a holding tank 26 propelled by a pump 28. Water in the tank 26 includes raw water from line 30 and recycled clarified water diverted from pipe 24 via line 32. Level control in the tank 26 is provided by level sensors 34a, 34b which control the operation of valve 36 in the line 32. Raw water feed terminates at the tank 16 in a set of four branched inlets 22b, that each extend vertically, with mutually equiangular spacing, into the flocculator 34 at its lower end.

Clarified water is removed via a clarified collection compartment 38 which is generally coextensive with, and sealed to the bottom of, the tank bottom wall 16c. The compartment 38 includes a generally cylindrical sidewall 38a, and a generally flat, solid bottom wall 38b. The clarifier 10 can be viewed as having a double bottom wall with bottom wall 16c being a "false" perforated bottom wall. Clarified water 40 collects in the compartment and drains to the pipe 24 via four branch conduits 24a that are mutually equiangularly spaced around the tank and are in fluid communication between the compartment and the outlet pipe 24. An adjustable valve 42 in the pipe 24 controls the clarified water outlet flow rate and the water level L in the clarifier. A principal feature of this invention is a pocket or layer 44 of pressurized gas that fills the compartment 38 between the bottom wall 16c and the collected clarified water 40.

The flocculator defines a zone I where a set of valves 46 release a stream of microscopic air bubbles from a supply of air dissolved under pressure in water produced in an air dissolving tube 47 (FIG. 3). The valves 46 can be of any conventional construction. The pneumatically operated valve sold by Krofta Engineering Corp. under the trade designation "KD" and described and shown in U.S. Pat. No. 5,320,750, the disclosure of which incorporated herein by reference, is preferred. The valves 46 are each positioned over one of the inlet branch conduits 22b. The microscopic air bubbles produced as the dissolved air is released from the valves are thoroughly mixed with the inflow of raw, treated water in the lower part of the flocculator, preferably below a lower support and bearing assembly 48, which in turn is rotatably mounted on a central base assembly column 50. As is well known, suspended solids in the raw treated water flock and the flocks attach to the air bubbles which causes the flocks to rise through the water to its surface where they form the floating sludge layer 12. Clarification begins in the flocculator; this first level of clarification in the flocculator is termed herein zone I. Degassing, that is, the release of gases dissolved in the water being treated, also occurs principally in zone I. The water which flows into the tank 16 carries with it a portion of the microscopic air bubbles sufficient to continue the DAF clarification in the tank.

The flocculator sidewall 15a below the support assembly 48 is solid. It isolates turbulence at the inlet from flotation occurring in the outer tank 16a and 16b. This is important since turbulence interferes with the flotation process. The upper flocculator sidewall 15b has a circumferentially extending series of openings 15c which provide a radially outward flow path for treated water from the upper region of the flocculator 14 to the tank 16. In addition, the wall 15 extends vertically so that in normal operation its upper edge lies slightly over the surface L of the water in the tank 16. When there is high solids content in the raw water, sludge and foam build up an the surface of the water in the flocculator and overflow into the tank 16.

Clarification by dissolved air flotation continues sequentially in two additional zones in the tank 16. The partially clarified, degassed water in the upper region 16a of the tank 16 undergoes further clarification in the calmer, less turbulent, and larger surface area region also denoted herein as zone II. Again, the movable wall 15 substantially isolates this region from the turbulence in the flocculator. Suspended solids flock together and are carried up to the surface of the water. Water clarified in zone II flows downwardly toward the collection compartment 38 and pass into a zone III defined by the lower tank region 16b and the lamellae 18. In zone III, a slow, final DAF clarification occurs in an array of inclined, open-ended, channels 52 formed by the intersecting and interconnected lamellae 18a and lab. As described in U.S. Pat. Nos. 4,931,175 and 5,296,149, the inclination of the conical, concentric lamellae 18b (shown in FIG. 2) has the effect of increasing the length of the rise path of the flocked particles, and thereby increasing the efficiency of the clarification as compared to that achievable with a direct vertical path. Treated water exiting the top of the flocculator thus flows generally downwardly through zones II and III of the tank, becoming increasingly clarified as it proceeds toward the bottom wall 16c of the tank via the channels 52.

The lamellae 18 preferably rotate slowly within the tank, either continuously, or, to save power, intermittently. The rotation produces negligible turbulence in zone III because the water being clarified is locked in the channels 52 which are open only at their upper and lower ends. The rotation is desirable since it controls "channeling", that is, a particulate build up between the channel outlets at the lower edges of the lamellae and the bottom wall 16c.

The tank bottom wall 16c containing an array of small holes 54 preferably evenly spaced over the wall 16c. They provide an outlet for the clarified water from the tank 16 to the collection compartment 38. The flows of the clarified water through the holes 54 is shown as 40a in FIG. 3. These flows are through the pressurized gas layer 44. The water level is controlled to a constant value. The gas pressure is variable, as described in more detail below. Adjusting the control gas pressure regulates the outlet flow volume from the tank 16 in response to the sensed level of the collected clarified water 40 in the compartment 38 and in response to the processed water flow.

A drive assembly 56 rotates the lamellae, the wall and a sludge removal assembly 58 in unison. The drive assembly includes a motor 60 and a driven gear box 61 mounted on a frame 62 which in turn is secured on the cover assembly 16e near the outer edge of the cover. The gear motor 60, 61 preferably incorporates a variable frequency controller, e.g. one which can vary the output speed over a 3:1 range. An output pulley 61a of the gear motor couples to a larger diameter pulley 63 via a timing belt 64. A tension adjuster 66 pivots about point 66a against the belt 64 biased by a spring 68 to maintain a reliable coupling between the belt and the pulleys 61a and 63. The pulley 63 is secured to a drive shaft 70 centered on the flocculator 14. The shaft 70 is supported in an upper support and bearing assembly 72 and the lower support and bearing assembly 48.

The lower assembly 48 includes a bearing unit 48a, a collar 48b secured to the shaft 70, and a spider of radial arms 48c coupled between the collar and the wall 15. This structure transfers rotary motion of the shaft 70 to the wall 15. Vertical stiffening flanges 15d strengthen the wall. A sliding seal 74 at the bottom of the wall 15 maintain an isolation of the flocculator and the tank despite the rotation. The lamellae are secured to the moving sidewall at the inner edge of the radial lamellae 18a. Wheels 76 secured to selected radial lamellae 18a at their lower, outer ends supports the lamellae and allow them to roll freely over the bottom wall 16c.

The upper support and bearing assembly 72 includes a bearing assembly 72a, engaged between the shaft 70 and a mounting bracket secured to the cover assembly flange 16e'''. The floor 16c of the tank 16 also includes a sump 130 formed in one radial sector, as is best seen in FIG. 1. The lamellae 18 preferably mount a flexible scraper 129 that extends radially over the bottom wall 16c and sweeps any particulate which have not been floated to the sludge layer into the sump for periodic disposal via a discharge port 130a.

The sludge removal system 58 shown in FIGS. 1 and 2 mounts four flexible paddles 78 on four arms of each secured at one end, directly or indirectly, to the rotating shaft 70. The paddles preferably extend, as shown, radially over the upper surface of the tank 16, from the wall 15 to the outer edge of the conical cover assembly 16e. Because the water level L is typically near the upper end of the conical wall 16e, the paddles 78 sweep sludge from a surface area that is less than half the horizontal cross sectional area in the region of the tank deferred by the cylindrical outer wall 16d. Vertically they each extend from the associated arm 80 downwardly to the normal operating level L of the water in the clarifier. Preferably, as shown, they extend slightly below the surface. As the paddles rotate, they push the sludge layer to rotate with them. The paddles are preferably formed of rubber fixed on the arms 80.

As the paddles rotate, they sequentially engage a fixed ramp 81 mounted in the clarifier and extending radially across the tank 16. The ramp 18, as used in the FIGS. 1–3 embodiment, is generally rectangular and is inclined from a radially-extending, leading, lower edge 81a that is typically in the water below the sludge layer to a following upper edge 81b that is above the surface of the water. As the paddle rotate, each paddle in turn pushes the sludge layer ahead of it up the ramp until it falls off the upper edge 81b into an entrance opening 82a in a radially directed sludge discharge pipe 82. The pipe 82 is preferably itself inclined so that the sludge in the pipe slides under the force of gravity away from the tank 16 for collection in a tank 128 (FIG. 3), or other disposal, e.g., directly in a positive displacement pump. The discharge pipe 82 penetrates, but is preferably sealed to, the cover assembly 16e. Rotation of the paddles thus continuously removes the floated sludge layer. Because the mass of the paddle assembly is small compared to that of conventional rotating blade scoop and scoops with a screw conveyors, the power required for its operation is correspondingly low. At steady state, the major power requirement is to overcome frictional losses, to lift a sludge mass up the ramp, and to flex the paddles as it progresses over the ramp—its vertical position being fixed by its attachment to one of the vertically fixed, rigid arms 80. The flexibility of the paddles is limited, however, by the stiffness required to advance a mass of wet sludge up the ramp.

With reference to FIG. 3, an air compressor 90 produces a supply of pressurized air that is fed via line 91 through pressure regulators 92 and 94, needle valve 96, and flowmeter 98 to the compartment 38 to produce the pressurized gas layer 44. A small amount of compressed air is constantly added to the compartment 44. The liquid level is controlled by an air bleed valve 100 to atmosphere, shown schematically. The pump 90 also feeds compressed air via line 102, valve 104, and flowmeter 106 to the air dissolving tube (ADT) 47, and via line 108 to the valves 46 to provide operating power applied in coordination with control signals from a timer/controller (not shown). The valves 46 are vented to atmosphere. A suction line 110 feeds clarified water 40 from the compartment 38 to a pressure pump 112. Pressurized water from the pump 112 flows in line 114 to the air dissolving tube 47. A pressure gauge 118 connected in parallel across the inlet and outlet of the ADT 47 measures the differential pressure produced by the inlet nozzle in the ADT. Such pressure difference indicates the flow volume of the recycled water. Line 120 conveys a supply of pressurized water with air dissolved in it to the valves 46.

In the main clarified water effluent outlet line 24, a pump 122 can be used if gravity withdrawal is not possible. A level sensor/transmitter 124 mounted on the tank 16 senses the water level in the tank 16. A level controller 126 receives the output signal of the transmitter 124 and produces corresponding control signals to the automatic valve 42. The controlled operating level of the water in the clarifier is shown at L. FIG. 3 also shows a gravity flow along sludge conduit 82 to the collection tank 128.

By way of illustration, but not of limitation, the clarifier 10 of FIGS. 1–3 with a twelve foot (3.69 m) diameter tank 16 has a three foot (0.92 m) diameter flocculator 14. The tank sidewall 16d extends twenty inches (51.2 cm) from the bottom plate 16c to the cover assembly 16e, which itself has a maximum height of about two feet (0.61 m) from the upper edge of the sidewall. The collection compartment has a height of about eight and a half inches (21.8 cm). The holes 54 are 9/32 inch (0.72 cm) in diameter uniformly spaced six inches (15.3 cm) center-to-center over the bottom wall 16c.

The drive includes a five HP, 1700 rpm motor 60 with a 150:1 gear reduction. The belt 64 introduces a 7.85:1 reduction due to the differences in the diameter of the pulleys 61a and 63. A 3:1 variable frequency controller can vary the output speed of the shaft 70 and connected drive components from 0.48 rpm to 1.44 rpm. The belt is plastic.

A typical total operating inflow rate for the clarifier 10 shown in FIGS. 1–3 and detailed above is about 600 gpm. The compressed air to the space 64 is supplied at a typical value of 100 psi. 10–60% (typically 25%) of the clarified outlet flow is recycled via the tank 26 in order to keep the hydraulic load constant to enhance clarification efficiency.

In operation a supply of raw water from inlet conduit 30 is held in the tank 26 where it is mixed with clarified water being recycled. The percentage recycle flow varies with the variation of raw water flow. The pump 28 supplies the raw, treated water to the flocculator where the valves 46 release streams of microscopic air bubbles. First clarification occurs directly in the flocculator together with degassing. Turbulence associated with introducing the raw water flocculating it, and treating it with air bubbles is substantially confined to, and dissipated in, the flocculator.

The compressor 90 supplies compressed air to create the air layer 44, produce the pressurized air for the ADT 47 and to operate the valves 46. The water level in the compartment 38 is controlled by the gas bleed being on or off. Gas (air) fed into the compartment 38 is preset to a constant metered flow. If more water is processed through the clarifier, the water level 44 in the compartment 38 falls because the level regulator 126 opens the outlet valve 42. This opens the gas bleed of valve 100. The gas pressure in compartment 38 falls and allows the increased flow through the holes. The gas pressure in the compartment is thus set automatically to balance the flow through the holes 54 with the flow through the valve 42.

Depending on the amount of sludge produced and its rate of production, the speed of rotation of the sludge removal system is set accordingly.

Based on prototype testing, it has been found that the clarifier 10 produces a clarification rate of about 6 GPM/SQFT/ (240 liters/min/m$^2$) versus a rate of 3.45 GPM/SQFT (130 liters/min/m$^2$) for a "Supracell" brand clarifier, a 1.75 times increase. This performance compares favorably with the theoretical limit of 7.5 GPM/SQFT2 (300 l/min/m$^2$). This rate difference translates into a significant improvement in treatment capacity for comparably sized units (same clarifier tank surface area). Based on known "Supracell" clarifier capacities, and multiplying those capacities by 1.75, clarifiers of the present inventions have capacities as follows:

| Diameter (feet) | GPM | m$^3$/min |
|---|---|---|
| 6 | 150 | 0.57 |
| 8 | 259 | 0.98 |
| 10 | 460 | 1.75 |
| 20 | 1,681 | 6.39 |
| 30 | 3,697 | 13.91 |
| 40 | 6,720 | 25.55 |
| 55 | 12,757 | 48.47 |
| 70 | 30,562 | 78.52 |

The clarifier 10 with a six foot tank (1.85 m) diameter has a total water volume in normal operation of 700 gallons, compared to 500 gallons for an eight foot diameter "Supracell" clarifier. The water head is greater and therefore the retention time is longer than with the "Supracell" clarifier—4.6 minutes versus 3.4 minutes. This increase in retention time is believed to be more than offset by the increased efficiency and compactness of the present invention. As to total weight, the increase in water volume is offset in part by the use of light weight materials, aluminum and plastic instead of steel, and by the elimination of the massive carriage of the "Supracell" clarifier which carried motors and a rotatable, spiral-bladed scoop. The drive as a whole is much lighter since, disregarding sludge loads, supports, bearings and the like, it must rotate only the sludge paddles 78, the wall 15, and the submerged lamellae 18.

For periodic cleaning, removal of the cover assembly leaves the flocculator and tank readily accessible from the top. The lamellae can be fabricated in sections for case of removal and cleaning. Coarse impurities that settle in the tank are collected in the sump 130 which can be periodically discharged as in the current "Supracell" clarifier operation. The clarifier 10 can also be periodically purged through a controlled program of adjusting the water level.

Because there is no scoop rotating around over the tank, the clarifier 10 can be covered to enclose the fluids being clarified. It can therefore readily operate with any gas or liquid. Depending on the application, the clarifier with the cover can be operated in an explosion proof manner for use in the petroleum industry, especially refineries.

To conserve power, it is also possible to operate the clarifier 10 intermittently, whereas the carriage of the "Supracell" and like clarifiers needs to be constantly in motion. Intermittent operation allows some thickening of the floated sludge layer, but by selecting the interval and duration of passes, sludge removal can still be effective. Cessation of rotation totaling fifteen minutes for each hour of operation is considered feasible. Continuous rotation of the lamellae is also not essential. Intermittent rotations is sufficient to control channeling and to clear coarse particulate build up on the tank bottom wall 16c.

Clarified water removal through shallow air pocket allows uniform removal over the entire tank bottom with a minimum of resistance to an outlet flow. The sump scraper 129 can also clear the outlet apertures 54.

FIGS. 4–9B show a clarifier 210 which is the presently preferred form of the present invention. It removes particulate contaminants that are successively clarified in a central flocculator 214 (zone I), a surrounding flotation tank 216, and in particular the upper portion 216a (zone II) of the tank, and a set 218 of laminar flow plates, or lamellae, located in the lower end of the tank 216, below zone II, and adjacent and over the bottom wall 16c of the tank. The set 218 of lamellae define zone III. The tank is supported on legs 20 and has a main raw water inlet conduit 22 that feed the raw water raw water treated with a flocculating agent, and containing dissolved, pressurized air, to the lower end of the flocculator 214 via branched inlet conduits 22b and associated valves 46 which produce the microscopic bubbles as the pressured dissolved air is released to a lower pressure through a narrow orifice. As in the FIGS. 1–3 embodiment, this flocculator contains the turbulence of this release, de-gasses the treated water, and begins the removal of the particulates by a first dissolved air flotation. (The air dissolving and liquid flow and level controls shown and described with reference to FIG. 3 can be used with clarifier 210 of FIGS. 4–9B.)

The water exists zone I, as in FIGS. 1–3, via openings 15c in the sidewall 215. (This wall can be viewed as, and is described herein as, either the sidewall 215 of the flocculator 214 or the inner wall of the flotation tank 216). Depending on the water level, water can also flow from zone I to zone II by simply flowing over the upper edge of the wall 215. Preferably, the upper edge of the wall 215 is at, or slightly below, the water level L so that a portion of the sludge layer 12 forming in zone I can float outwardly over the tank 216 for removal.

DAF clarification continues in zone II, and then zone III. As in FIGS. 1–3, water exiting zone III via holes 54 in the tank bottom wall 16c are fed by gravity, against a gas pressure, into collection compartments 38 where clarified water 40 collects and is discharged through outlets 24a to conduit 24. The compartment 38 holds a layer 44 of pressurized gas, such as air, between the perforated bottom wall 16c and the collected water 40. Thus, the flocculation, clarification, and collection of clarified water in the FIGS. 4–9 embodiment proceeds in essentially the same way as in the FIGS. 1–3 embodiment.

One major difference in the FIGS. 4–9B embodiment is that the lamellae do not rotate in the tank—they are stationary. Previously, it had been thought that their rotation was necessary to counteract the fouling of the plates, channels, and the holes 54 in the bottom wall of the tank. Intersecting plates were thought to be necessary in the FIGS. 1–3 embodiment to carry a column of water in a turbulence-free environment despite the rotation of the lamellae. A main insight of the FIGS. 4–9B embodiment is that a set of non-rotating lamellae, preferably an array of radial, inclined plates 218a that substantially fill the bottom region of the tank 216, can produce the desired enhanced flotation clarification (due to the inclined, rise paths 252 for the flocks defined between adjacent plates) without adverse effects from fouling, or otherwise.

The plates are preferably sheets of aluminum or other suitable structural material having a generally rectangular shape. Their thickness is determined by the need for the plates to remain flat and to contribute to the structural integrity of the assembly 218. The plate material is selected for structural strength, low weight, and resistance to corrosion and fouling in use. While the plates 218a as shown are flat, they may be curved, either about a vertical or horizontal axis, or both. Curving the plates can alter the length of the rise path, promote a more efficient use of the available space, or other advantages. Further, while the plates are shown as radially oriented within the task, they can be overlapping concentric rings of plates, or the set 18 of intersecting plates, but not rotated. These alternative arrangements, however, are more costly to manufacture and are less desirable operationally then the radial array of flat plates.

Figure 7:
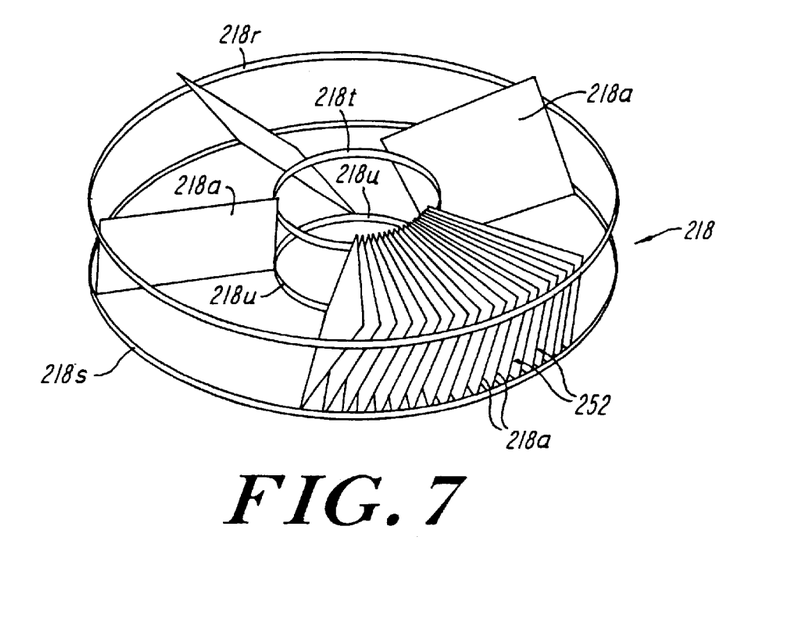
FIG. 7 is a simplified view in perspective of the stationary radial plate assembly shown in FIGS. 5 and 6.

As been seen in FIG. 7, the radial lamellae 218a are preferably mounted, as by welding in inclined slots formed in a vertically spaced pair of outer mounting rings 218r and 218s, and in corresponding inclined slots in a second pair of vertically spaced inner rings 218t and 218u. The outer rings 218r and 218s are secured to the tank wall 216d. There is a clearance between the rings 218t, 218u and the inner wall 215. A moving wall 217 occupies this clearance. It is propelled by drive assembly 56. The degree of inclination of the lamellae can vary depending on the application, but an angle of about 60° from the horizontal is preferred for many applications. It has been found to provide a significantly enhanced rise path—as compared to the normal vertical rise path without the lamellae—while not being so steep an inclination as to clog or become restricted by fouling.

The fact that the lamellae 218a are stationary has the significant advantage of reducing turbulence produced by rotating lamellae in the tank. In the FIGS. 1–3 embodiment, rotation of the channels 52 nevertheless produces some turbulence, at least at the interface between the moving water in zone III and the non-rotating, or less rotating, water in zone II. Some turbulence is also produced by any moving element projecting outside of the channels. Turbulence is highly destructive of the DAF process, therefore, any reduction in turbulence improves performance.

Fixing the lamellae in the tank also avoids the use of the wheels 76 under the lamellae. This is significant because the wheels 76 can fail and lock. While the clarifier can continue to operate with a locked or failing wheel, this situation greatly increases the power (and sometimes noise) required to operate the clarifier 10, and requires the clarifier to be shut down and repaired.

Connecting the rotating lamellae in the FIGS. 1–3 embodiment to the inner wall 15 requires that this wall rotate, which in turn requires the rotating seal 74. However, in practice, it was found that this seal wears and can fail, causing a "short-circuit" flow of raw water from the flocculator 14 to the bottom of zone III containing clarified water that has traversed the three clarification zones of the clarifier 10. The stationary lamellae of FIGS. 4–9B avoid this problem. The wall 215 is fixed, e.g., welded, to the tank bottom wall 216c; there is no rotary seal. The isolation of the raw water from the clarified water is therefore maintained with reliability.

In FIGS. 1–3, rotation of the lamellae assembly 18 was used, via the attached scraper 29, to clear settled particulates, and to some extent the bottom wall openings 54. With the fixed lamellae set 218, one or more scrapers 229, preferably four equiangularly scrapers 229, perform the same function. However, they are separate from the lamellae assembly; they are mounted to, and driven by, the rotating wall 217. Rotation of the wall 217 causes the scrapers 229 to sweep the bottom wall of the tank. Settled particulates are pushed to the sump 130 and drained periodically via the discharge port 130a. The scrapers also help to clean the bottom portions of the lamellae. The rate of rotation of the scrapers 229 is slow to reduce turbulence as much as possible, consonant with the performance of their functions. Rotation rates of 0.3 to 1.0 rpm are typical. The exact rate used will vary with the application.

Another significant modification is in the construction of the sludge removal system 258. Like the removal system 58 in FIGS. 1–3, it uses four paddles 280 mounted on four radial arms 278 secured to the shaft 70 and rotating in unison with it. It also includes a ramp 281 fixed in the tank before an opening 282a in the upper surface of a sludge discharge conduit 282. However, the paddles 280 extend radially over the full diameter of the tank 116, from the inner wall 115 to the cylindrical tank outer wall 116d.

This straight cylindrical upper tank wall 216d (as opposed to the conical wall in the FIGS. 1–3 embodiment) greatly increases the available surface area for the flotation clarification process. Heretofore, this larger surface area was considered impractical since a paddle-type sludge removal system had difficulty in keeping up with a high sludge production rate and in removing thick sludges, particularly at the outer portions of the tank (which produces significantly more sludge than the inner portions due to their greater surface area).

Figure 8:
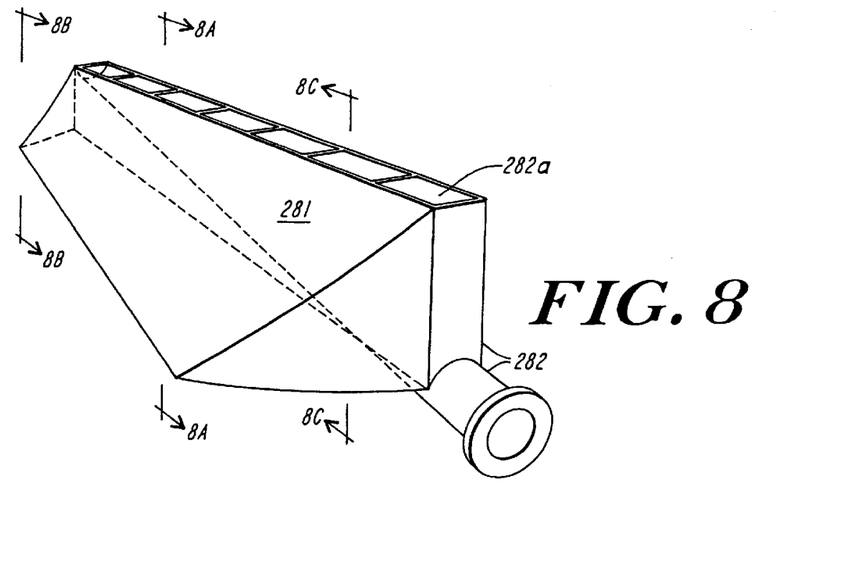
FIG. 8 is a detailed view in perspective of the sludge removal ramp show in FIGS. 4 and 5.
Figure 8A:
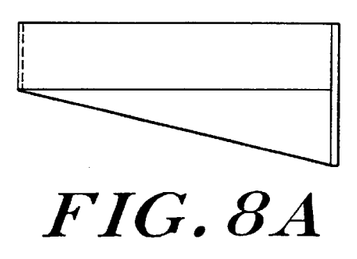
FIGS. 8A–8C are views of the sludge removal ramp taken along the lines A—A, B—B and C—C, respectively, of FIG. 8.
Figure 8B:
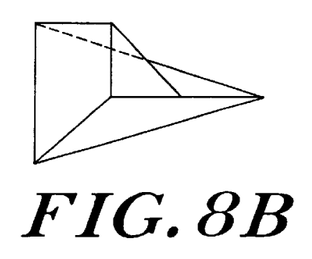
Figure 8C:
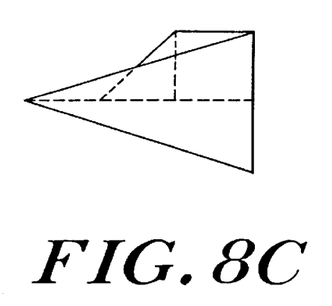
Figure 8D:
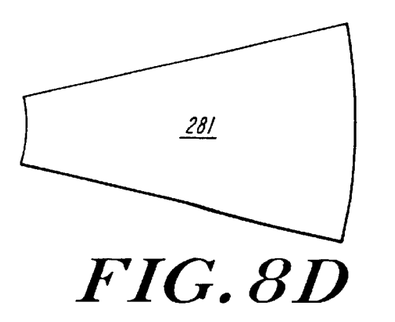
FIG. 8D is a top plan view of the sludge ramp shown in FIGS. 8 and 8A–8C.

The design of the ramp 281 best seen in FIGS. 8–8D is important to the successful operation of this sludge removal system. The ramp 281 preferably extends over a sector of the tank 216. When each paddle 280 is drawn successively over the ramp, thereby lifting the sludge collected by the paddle, the ramp presents a longer, shallower surface at its outer radii and a shorter, steeper surface at its inner radii. The length of the ramp increases as a function of radius, and its inclination from the horizontal decreases as a function of radius. Preferably, the degree of twisting is generally uniform as a function of the radius. By way of illustration, if the ramp extended to the center of the clarifier, the angle $\alpha_r$ at r=0 would be 0°, vertical. If the inner wall 215 is at radius r=R/3, where R is the maximum radius at the outer wall 216d, then the angle $\alpha_r$ is ⅓ of $\alpha_R$. The less steep ramp near the outer wall provides a larger mechanical advantage to lift the larger, heavier sludge loads at the larger radii where more sludge is produced and collected.

While the dimensions and configuration of the ramp will vary with the size and application of the clarifier 216, for a five inch lift (water level L to discharge conduit opening 282a) the ramp 281 preferably has an $\alpha_R$ of 60° (measured from the vertical) at its outermost edge, and an inclination $\alpha_r$ of 20° at its innermost edge. In effect, the ramp surface is thus "twisted" or "warped" about its radial/longitudinal axis. Note also that the paddle is in substantially constant engagement with the ramp across its length. This helps to distribute the stress of the collected sludge load uniformly across the paddles as they traverse the ramp, and to prevent sludge from flowing back into the tank as it is lifted.

Figure 9:
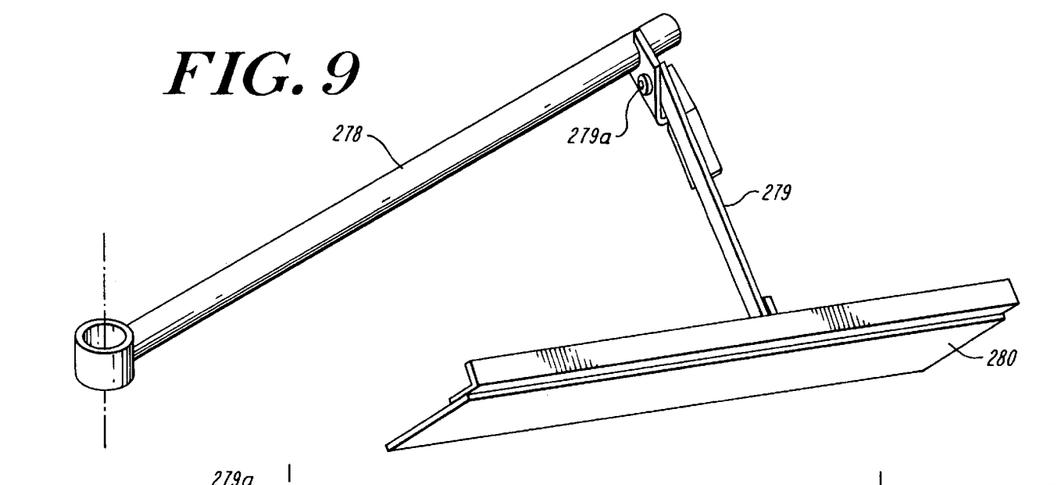
FIG. 9 is a detailed view in perspective of the sludge paddle assembly shown in FIGS. 4 and 5.
Figure 9A:
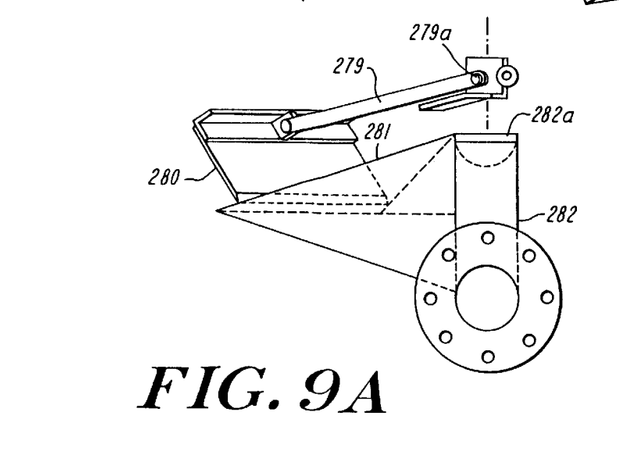
FIG. 9A is an end view of the sludge removal system and outlet conduit shown in FIGS. 4, 5, 7 8–8C and 9 with a paddle assembly shown in its normal, sludge-collecting position as it first engages the ramp.
Figure 9B:
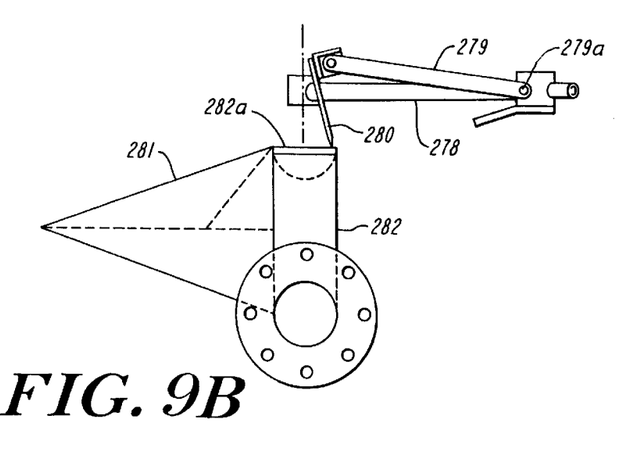
FIG. 9B is a view corresponding to FIG. 9A, but with the paddle assembly in its raised, sludge-dumping position as it leaves the sludge conduit.

The paddles 280 also differ from the paddles 80 in that they are mounted on the end of a pivot arm 279, which in turn is pivotally mounted at 279a to one of the radial arms 278. The paddles are fixed to the arms at an angle such that they rotate over the water held in the tank (set by a stop bracket 283 fixed on the radial arm 278), the bottom edge of each paddle is at, or slightly above, the water level L and the paddle is raked slightly forwardly, e.g., at about 75° from the associated pivot arm and about 30° from the vertical when the paddle is in its lowered "skimming" position. This angle of attack allows the paddles to skim the sludge layer 12 from the surface of the water and advance it up the ramp 281 for disposal to the conduit 282 more effectively. FIG. 9A shows the paddle 280 as it first engages the leading edge of the ramp 281, and is still at the water-level position for skimming. FIG. 9B shows the paddle 280 in its fully raised position, after the collected sludge has been drawn up the ramp and dumped. The paddle shown in FIG. 9B has passed the opening 282a and is about to swing back down to its original sludge-skimming position.

The paddles 280, like the paddles 80 in FIGS. 1–3, are preferably sheets of rubber or the like material that are bolted, riveted, screwed, clamped, or other secured to an associated arm 278. To provide the wiping/sealing qualities of a resilient material while having the rigidity to collect and advance a sludge load, the paddles are preferably reinforced over their upper and central portions by a metal backing plate. The paddles 280 are each sized so that when in the lowered, skimming position, the lower edge of the paddles, as noted above, is at or just over the water surface. The radial dimensions are such that, the lower paddle edge sweeps the full radius of the tank, from an inner radius generally over the wall 215 to the outer tank wall 216d. The materials of the paddles and their thickness is chosen to have the wear resilience and wiping ability to accommodate repeated travel over the ramp while having the strength to hold and lift the sludge collected on the paddle.

The 210 clarifier also differs from clarifier 10 in the details of the drive bearings and support structures. There is no central base assembly column 50 in the clarifier 210. Rather, the shaft 70 rests on a thrust bearing 248 supported by four radial arms 249 secured to fixed wall 215. Radial arms 251 connect the lower end of the shaft 70 to the upper end of the movable wall 217. The lower end of the wall 217 rotates in a bearing 253. As noted earlier, scraper 229 are mounted at one end to the wall 217. Rotation of the shaft 70 thus rotates in unison the four paddles 280 via the arms 278, the arms 251, the wall 217, and the scrapers 229. Because this is a comparatively light-weight assembly as compared to the carriage and spiral scoop used for the Supracell clarifier, and even as compared to the clarifier 10 which rotates the plate assembly 18, less power is required for moving components of the clarifier and more power is available to collect and lift the increased sludge load produced by the clarifier 210. As also noted above, there is less mass moving in the tank 216 than in the tank 16, which produces less turbulence.

Clarifier 210 also uses a set of radially extending support plates 239 secured in the compartment 38. They are oriented on edge to span and thereby support the weight of the water in the tank 216. Openings 239a in the upper and lower edges of the plates 239 allow a circumferential circulation of the pressurized gas layer 44 and the collected clarified water 40.

By way of illustration, but not of limitation, the clarifier 210 of FIGS. 4–9B with a six foot (1.85 m) diameter tank 216 has a 22 inch (0.56 m) diameter flocculator 214. The cylindrical tank sidewall 216d extends fifty-four inches (51.2 cm) from the bottom plate 16c to its upper edge. The tank provides a flotation area of about 25 square feet. The water level L is typically 42 inches measured from the bottom wall 16c. The collection compartment has a height of about four inches (10.2 cm). The holes 54 are 9/32 inch (0.72 cm) in diameter uniformly spaced six inches (15.3 cm) center-to-center over the bottom wall 16c. The lamellae plates 218a extend vertically for 18 inches at and inclination of 60° from the horizontal. There are 150 plates, preferably of 0.08 inch thick aluminum, secured, preferably welded, in flanged or angled aluminum rings, 1 inch by 1 inch by 3/16 inch thick in cross section.

The drive includes a motor 60 with a 1:150 gear reduction. The belt 64 introduces a 1:12.2 reduction due to the differences in the diameter of the pulleys 61a and 63. A 1/3–1.5 variable speed motor with basic 1725 rpm vary the output speed of the shaft 70 and connected drive components from 0.3–1.4 rpm.

There are preferably four paddles 280 formed of 1/8 inch thick neoprene in 6.0 inch by 23.75 inch rectangles backed by an aluminum panel riveted or otherwise secured to the neoprene while leaving the lowermost portion (e.g., 1 inch) of the paddle free to flex. The pivot arm is 12½ inches long. The paddle is set at an angle of 75° with respect to the pivot arm.

A typical total operating inflow rate for the clarifier 210 shown in FIGS. 4–9B and described above is about 231 gpm through an effective operating water volume of about 90 cubic feet or 974 gallons. The retention time is about 2.9 minutes. The compressed air to the space 64 is supplied at a typical value of 100 psi. As with the clarifier 10, 10–60% (typically 25%) of the clarified outlet flow is recycled via the tank 26 (FIG. 3) in order to keep the hydraulic load constant to enhance clarification efficiency.

Viewed as a process, the present invention sequentially clarifies a flow of treated raw water in a flocculator zone I (where excess air is released and the water is calmed) and two vertically adjacent zones II (where a pre-clarification occurs) and III (where final clarification occurs) in fluid communication with the flocculator and each other, but substantially isolated from turbulence in the flocculator. Quiet zone III clarification involves passing the treated water through an array of inclined, open-ended regions defined by a set of plates inclined to overlap at least partially adjacent plates when viewed vertically. Clarified water removal includes the step of gravity feeding clarified water from zone III through an array of apertures and through an underlying pressurized gas pocket. Sludge removal steps include moving a floated sludge layer up a ramp for a radially directed removal from the clarifier, preferably by gravity feed. The invention includes varying the ramp length and inclination as a function of radius in order to lift large and heavy sludge loads, particularly those produced at the larger radii.

There has been described a clarifier and clarification process which is compact and operates at a highly increased clarification rate and capacity compared to a like-sized, single stage (clarification, no filtration) DAF clarifier and processes. The present invention provides an almost 75% increase in capacity per square foot (6 GPM/sq.ft. versus 3.45 GPM/sq. ft. for a "Supracell" clarifier) over the most commonly used "zero-velocity" DAF clarifier and an almost 300% increase in capacity per square foot over the "Sedifloat" one stage, single tank DAF clarifier. The clarifier and process of this invention reduce the weight of moving parts, particularly the lamellae and sludge removal apparatus, and thereby reduce the power required for operation.

The clarifier and process of the present invention also lend themselves to the use of low-weight materials and low cost fabrication techniques. Clarification is generally continuous operation of moving components can be intermittent. The clarifier and process can be enclosed to process fluids and use gases which are toxic, highly volatile, flammable, or even explosive. Level control, periodic purging, and cleaning of internal components are all performed readily.

While the invention has been described with respect to its preferred embodiments, various modifications and alterations will occur to those skilled in the art from the foregoing detailed description and the accompanying drawings. For example, while the plates 218a have been described as generally flat sheets oriented generally radially, or other more complex shapes, e.g., curved, can be used as well as other mounting arrangements. For example, the plates could be mounted as concentric rings, but with likely attendant increases in fabrication costs and with a less efficient use of a given volume of the tank in zone III. In general, reduced performance or increased costs, both of materials and of fabrication, are considered drawbacks of such alternative constructions.

The clarifiers according to the present invention have been described herein as having ring-like tanks with a central flocculator separated by a generally cylindrical wall. While this construction is preferred, other geometries are possible, albeit with anticipated reductions in performance or increases in manufacturing and or operating cost. For example, the tank could be rectilinear, as in U.S. Pat. No. 5,268,099, with a flocculator or flocculators positioned in the tank for the sequential flows described herein. The upper openings 15b in the flocculator wall could also assume a variety of configurations, locations and designs, e.g. conduits or directed vanes mounted in the wall, or a castellated upper edge of the flocculator wall which has vertical flow-through slots extending to the upper edge. Regardless of the precise mechanical implementation, the turbulence first clarification and degassing should be substantially isolated in the flocculator and there should be a smooth flow, of sufficient volume and at a sufficient rate, to produce the desired clarification action in zones II and III of the tank.

While the invention has been described with respect to two forms of sludge removal, others can be used, again with some expected loss of advantages stated herein. For example, paddles could be stiff, hinged, and spring-loaded to pass over the ramp. Or the support arm itself can flex or have a spring-loaded torsional movement.

The clarifiers 10, 210 could be operated to some advantage without the gas layer 44, but a direct and significant decrease in performance would be expected.

While operation with a cover is a significant advantage of this invention, again, other advantages are still available if a cover is not used. Similarly, while a particular offset drive is described, those skilled in the art will readily perceive that there are myriad power source and power transmission arrangements for generating a rotary motion of the sludge removal system and settled particulates. For example, a direct overhead drive by a centrally mounted motor and variable speed gear transmission is possible.

These and other modification and variations are intended to fall within the scope of the appended claims.

What is claimed is:

1. A flotation clarifier of raw water treated with a flocculating agent comprises:

a tank having a bottom and inner and outer sidewalls that are generally cylindrical and stationary, an inlet for the raw water, an output for the clarified water, apparatus that releases pressurized water with dissolved gas therein to produce a stream of microscopic air bubbles, a flocculator centrally located within said tank inner sidewall and defining a first zone that receives the raw, treated water from said inlet and dispenses it with said stream of microscopic air bubbles produced by said pressure release apparatus into the flocculator to produce a first flotation, degassing and calming within the flocculator, means for directed treated water from the flocculator to a second zone in the tank surrounding the flocculator where a second flotation clarification occurs, a set of fixed lamellae mounted in said tank below said second zone and adjacent said tank bottom wall which produce an array of inclined, overlapping rise paths in the water being clarified, said set of lamellae extending generally over the tank bottom from said flocculator to said tank sidewall, said rise paths producing a third flotation clarification zone, and means for removing a floating sludge of flocculated contaminants produced by said flotations from the upper surface of the water held in said flocculator and said tank, wherein said clarified water outlet comprises a plurality of apertures in said tank bottom wall, a layer of a pressurized gas underlying said bottom wall, and a clarified water colletion compartment surrounding said pressurized gas layer, and an outlet conduit for the clarified water then collected.

2. A flotation clarifier of raw water treated with a flocculating agent comprises:

a tank having a bottom and inner and outer sidewalls that are generally cylindrical and stationary, an inlet for the raw water, an output for the clarified water, apparatus that releases pressurized water with dissolved gas therein to produce a stream of microscopic air bubbles, a flocculator centrally located within said tank inner sidewall and defining a first zone that receives the raw, treated water from said inlet and dispenses it with said stream of microscopic air bubbles into the flocculator to produce a first flotation, degassing and calming within the flocculator, means for directing treated water from the flocculator to a second zone in the tank surrounding the flocculator where a second flotation clarification occurs, a set of fixed lamellae mounted in said tank below said second zone and adjacent said tank bottom wall which produce an array of inclined, overlapping rise paths in the water being clarified, said set of lamellae extending generally over the tank bottom from said flocculator to said tank sidewall, said rise paths producing a third flotation clarification zone, means for removing a floating sludge of flocculated contaminants produced by said flotations from the upper surface of the water held in said flocculator and said tank, and a scraper, extending radially over the upper surface of said tank bottom wall, an assembly for mounting the scraper to rotate around said tank bottom wall and a drive to rotate said mounting assembly and said scraper.

3. The clarifier of claim 2 wherein said mounting assembly includes a rotating cylindrical wall that closely surrounds said tank inner wall.

4. The clarifier of claim 2 wherein said sludge removal means comprises at least one paddle that advances said flotated sludge as it rotates, a sludge removal conduit extending generally radially across said tank from said inner sidewall to said outer tank sidewall and is open at its upper surface to receive the sludge.

5. The clarifier of claim 4 wherein said sludge removal means further includes a ramp located in a sector of said second zone and disposed to coact with said advancing paddle to raise said floated sludge collected by said paddle and feed it to said opening in said sludge removal conduit.

6. The clarifier of claim 4 wherein said ramp twists about its radial axis and varies in width from a shallow, long portion adjacent the outer tank wall to a steep, short portion adjacent said tank inner wall.

7. The clarifier of claim 6 wherein said ramp extends circumferentially so that it is generally in continuous contact with a bottom portion of said paddles as they traverse over said ramp.

8. The clarifier of claim 6 wherein said ramp extends in the direction of the rotation of said paddle so that it is generally in continuous contact with the lower edge of said at least one paddle as it rotates over said ramp.

\* \* \* \* \*